US005487418A

United States Patent [19]
Reyes

[11] Patent Number: 5,487,418
[45] Date of Patent: Jan. 30, 1996

[54] GAS CAP CONSTRUCTION

[76] Inventor: Bernard Reyes, 510 Mokauea St., Honolulu, Hi. 96819-3231

[21] Appl. No.: 320,668

[22] Filed: Oct. 11, 1994

[51] Int. Cl.⁶ .................................................. B65D 51/24
[52] U.S. Cl. ................. 141/392; 220/212; 220/DIG. 33; D8/354; D15/9.1; 251/90
[58] Field of Search .................................. 141/1, 98, 392; 220/212, DIG. 33; 251/90, 101, 107, 111, 114; 74/526; D8/349, 354; D15/9.1

[56] References Cited

U.S. PATENT DOCUMENTS

| | | | |
|---|---|---|---|
| D. 326,462 | 5/1992 | Cooper | D15/9.1 |
| 4,216,807 | 8/1980 | Diamond | 141/392 |
| 4,236,552 | 12/1980 | Rayboy | 141/98 |
| 4,377,243 | 3/1983 | Shaw et al. | 220/DIG. 33 |
| 4,544,007 | 10/1985 | Abraham | 141/392 |
| 4,644,984 | 2/1987 | Abraham | 141/392 |
| 4,683,923 | 8/1987 | Harris | 141/392 |
| 4,802,516 | 2/1989 | Dahlem | 141/392 |
| 5,062,541 | 11/1991 | Galbo | 220/212 |

*Primary Examiner*—J. Casimer Jacyna
*Attorney, Agent, or Firm*—Michael I. Kroll

[57] ABSTRACT

An improved construction for a vehicle gas cap includes a threaded engagement portion, a main body for sealing the gas tank throat and for allowing manipulation of the improved cap, a disk, and a hinged C-clamp attached to the main body. The disk is dimensioned such that it allows for the retaining of the trigger of a gas pump handle in an operable position when fitted into the gas pump handle trigger slot. The C-clamp portion is dimensioned such that it allows for the retaining of the trigger of a gas pump handle in an operable position when fitted thereover. The disk of the cap is the same height as the clamp portion's thickness, and allows for a flush surface overall when the C-clamp is folded down into a closed position.

3 Claims, 4 Drawing Sheets

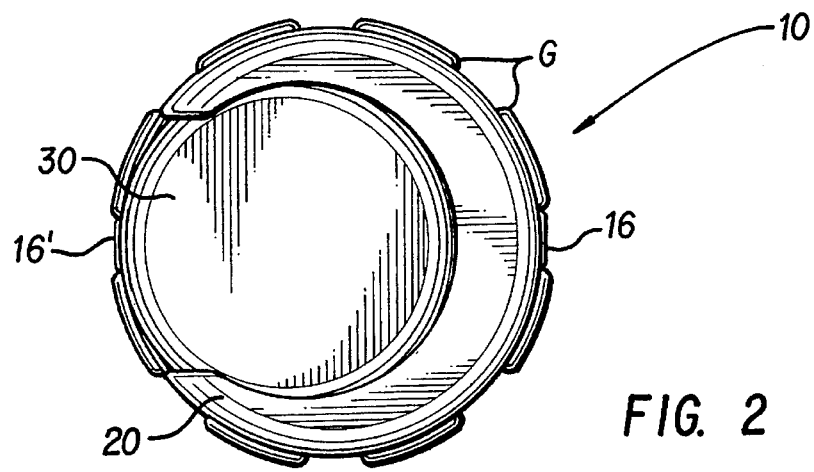
FIG. 2
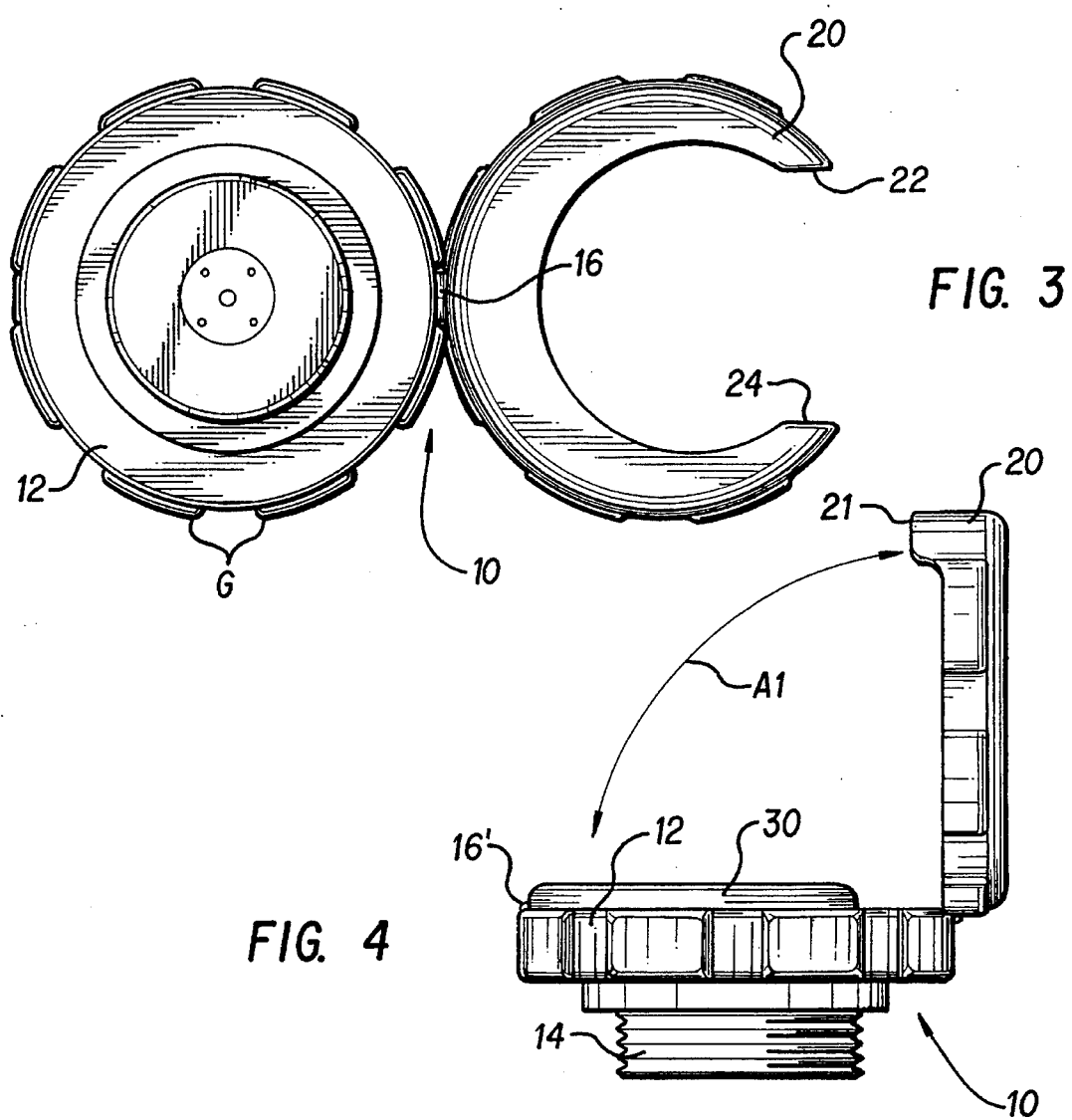
FIG. 3
FIG. 4

GAS CAP CONSTRUCTION

BACKGROUND OF THE INVENTION

1. Field of the Invention

The present invention relates to sealing devices for liquid storage tanks. More specifically, it relates to a cap for a gas tank on a vehicle, including hinged, folding portions that allow the user to hold the trigger of a gas pump into an open position. In general, it relates to any sealing cap for a storage tank wherein a folding hinged portion to attach or clamp the cap to various objects would be useful.

Thus it can be seen that the potential fields of use for this invention are myriad, and the particular preferred embodiment described herein is in no way meant to be limiting the particular field chosen for exposition of the details of the invention.

2. Description of the Prior Art

Full service gas stations are almost completely a thing of the past. In service stations, "self serve" is the norm. Drivers exit their vehicles, remove the gas cap from the tank, insert the pump handle, and activate the trigger to fill the tank. A time wasting drawback to this is that other maintenance (washing the windshield, checking the oil) that needs to be done must wait until after the desired amount of gasoline has been put into the tank. The present invention seeks to address this problem by providing a gas tank wherein a C-shaped clip is hinged to the gas cap to allow the user to fix the trigger of the pump handle in place, leaving he or she free to pursue other maintenance chores.

In the course of a search at the U.S. Patent and Trademark Office, the following relevant United States Patents were uncovered:

U.S. Pat. No. 4,236,552 issued on Dec. 2, 1980 to Eric R. Rayboy discloses a gasoline pump clip cap. This includes a U-shaped channel on the handle portion of the cap, and it is disclosed that the clip portion may or may not be hinged. The patented clip portion adds significantly to the overall height of the exposed portion of the gas cap, whether pivoted or not.

Contrast this to the present invention, wherein the main body of the cap is provided with a recessed area such that a smooth surface is provided overall when the clip is folded into the closed position and the overall height of the exposed portion of the gas cap not increased by the clip and is on the order of one half inch.

Next is U.S. Pat. No. 4,544,007 issued on Oct. 1, 1985 to Samuel R. Abraham. This discloses a vehicle gasoline tank cap wherein extensions are placed on opposite sides of the periphery of the cap. This allows the user to interpose the cap such that the trigger of the pump is retained in an open position. The overall diameter of the exposed gas cap portion is significantly increased by the radial extensions on the periphery of the patented gas cap. This can lead to problems of access on many newer model cars where the gas cap is recessed in a small receptacle like area hidden underneath the vehicle fender. The patent shows no hinged portion of the gas cap.

By contrast, the present invention includes a folding clamp portion that folds into a non-use position that neither increases the height or the overall diameter of a standard sized gas cap. This is accomplished by providing a nested hinged portion of the cap which is not present in Abraham.

U.S. Pat. No. 4,644,984 issued on Feb. 24, 1987, also to Samuel R. Abraham discloses a self service gas cap wherein the cap includes a raised torque handle portion having recessed edge portions that are provided with a resilient material to prevent slippage when interposed, as in the Abraham '007 patent above, between the trigger and body of the pump handle to retain the same in an open position. The disadvantage of this particular patent of Abraham is that, as in Rayboy above, the overall height of the exposed portion of the gas cap is significantly increased.

By contrast, the present invention includes a folding clamp portion that folds into a non-use position that neither increases the height or the overall diameter of a standard sized gas cap. This is accomplished by providing a nested hinged portion of the cap which is not present in Abraham.

In U.S. Pat. No. 4,683,923 issued on Aug. 4, 1987 to Charles M. Harris there is disclosed a clip for use with a pump dispensing handle. This has a rear shank with two extending arms. Each of the extending arms has a plurality of flat topped teeth forming a serrated surface thereon. This is unlike the present invention in that there is no teaching of the device being attached to a sealing cap for a gas tank, hinged or otherwise. As such the patented device merely shows a single use tool for holding open a gas pump nozzle. The tool has no utility as a gas cap and has no hinged parts.

By contrast the instant invention shows a dual function apparatus which can be used as a tool to hold open a gas pump nozzle and also be used as a gas tank cap. This is accomplished by providing a nested hinged portion of the cap which is not present in Harris.

Lastly, U.S. Pat. No. 4,802,516 issued on Feb. 7, 1989 to David F. Dahlem discloses a nozzle lock gas cap wherein an elliptical flange is provided in the cap such that it may be interposed in a variety of ways between the trigger and handle of a gas pump to control the flow therethrough. There are no hinged portions to the cap and its overall diameter is increased along the major axis of the ellipse.

This is dissimilar in comparison to the present invention in that no hinged portion or clamp is suggested. In addition the overall diameter of the exposed portion of the gas cap is increased thus reducing its accessibility in tight quarters.

None of the above inventions and patents, taken either singly or in combination, is seen to describe the instant invention as claimed.

SUMMARY OF THE INVENTION

The present invention is an improved construction for a vehicle gas cap. The cap includes a threaded engagement portion, a main body for sealing the gas tank throat and for allowing manipulation of the improved cap, a hinged disk for insertion into the gas pump handle trigger slot, and a hinged C-clamp attached to the main body. The hinged disk is dimensioned such that it allows for the retaining of the trigger of a gas pump handle in an open position when fitted into the gas pump handle trigger slot. The C-clamp portion is dimensioned such that it allows for the retaining of the trigger of a gas pump handle in an open position when fitted thereover. The hinged disk of the cap folds inside the clamp portion. This hinged disk is the same thickness as the clamp portion, and allows for a flush surface overall when the C-clamp and hinged disk are folded down into a closed position. Neither the height or overall diameter of the exposed portion of a standard sized gas cap is increased by this invention.

Accordingly, it is a major goal of the invention to provide an improved gas cap construction that overcomes the limitations of the prior art.

It is, moreover, a principal object of the invention to provide an improved gas cap construction wherein a hinged clamp portion can be unfolded and placed over the trigger and handle of a gas pump to retain the pump in an open position, allowing the user to attend to other aspects of the vehicle's maintenance.

It is another object of the invention to provide an improved gas cap construction wherein the hinged clamp portion is foldable into a closed position such that it fits into a corresponding recessed area in the main body of the cap, therefore presenting a substantially flush surface and saving space proximate the gas tank throat.

It is a further object of the invention to provide an improved gas cap construction wherein a hinged disk is dimensioned to allow the user to fit it into the standard slot provided on most gas pump triggers, thus retaining the pump in an open position.

It is a major goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a top view of the present invention showing the clamp portion and hinged disk folded into a closed position within the recess provided in the main body.

FIG. 3 is a bottom view of the present invention, with the clamp portion unfolded into an open position.

FIG. 4 is a side view of the present invention, with the clamp portion unfolded into a 90 relationship with the main body of the cap.

DETAILED DESCRIPTION OF THE PREFERRED EMBODIMENT

Figure 1:
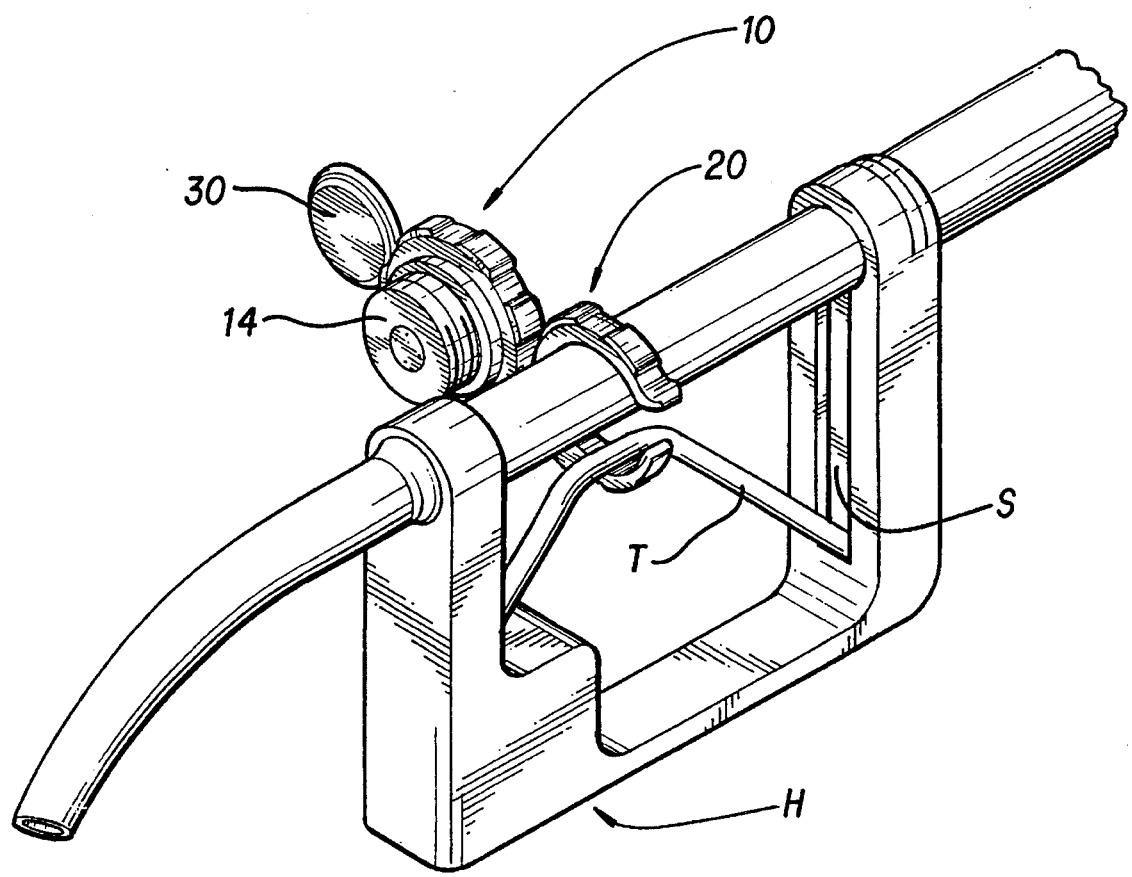
FIG. 1 is an environmental perspective view of the present invention showing the gas cap clamp portion unfolded and maintaining the gas pump handle and trigger in an open position.
Figure 1A:
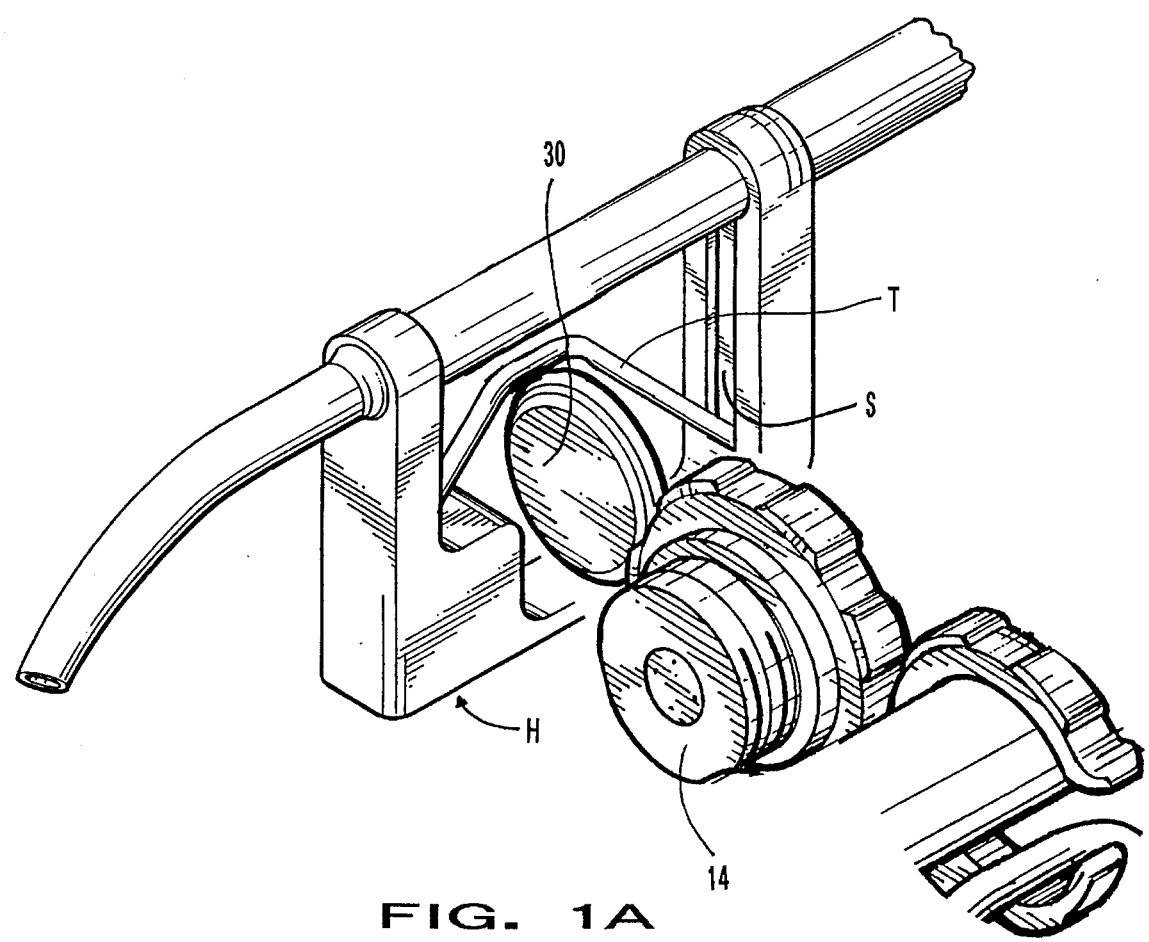
FIG. 1A is a perspective view showing the use of the disk to hold the trigger open.

The present invention is indicated in the figures generally at 10. The improved cap construction 10 has a main body 12, a threaded tank throat engagement portion 14, a disk 30 and a C-shaped clamp portion 20. Additionally, on the periphery of the body 12, as best seen in FIGS. 2 and 3, are protruding grip members G, to allow the cap 10 to be removed and replaced within the filling throat of the gas tank (not shown). The grip members G form grooves between them that are sufficiently deep to allow easy twisting and removal of the gas cap even when the user might be wearing heavy gloves. Clamp portion protrusion 21 firmly fits in the space between cap grip members G for securing clamp portion 20 in the folded position.

The clamp portion 20 is attached to the main body 12 of the cap 10 by hinged attachment means 16, as seen in FIG. 3. These hinge means 16 could be leaf springs, biased or unbiased, "living" hinges made from integral reduced thickness sections of plastic, or any number of known art devices that would allow for rotational movement of the clamp portion 20 in relation to the rest of the cap 10, as described by directional arrow A1 in FIG. 4. The body portion 12 of the cap 10 has a disk area 30 located on the side of the body 12 opposite that of the tank throat engagement portion 14. As can be seen in FIGS. 2 and 4, this disk area 30 allows for a substantially flush surface when the clamp portion 20 is moved into the "folded" position seen in FIG. 2. By virtue of the height of this disk surface 30 being the same as the thickness of the clamp portion 20, when the clamp portion 20 is in the folded position, the cap 10 takes up no more space than a conventional gas cap. This is important, as the gas caps in most vehicles are located under various hinged, locking covers with a minimal amount of excess space.

Figure 5:
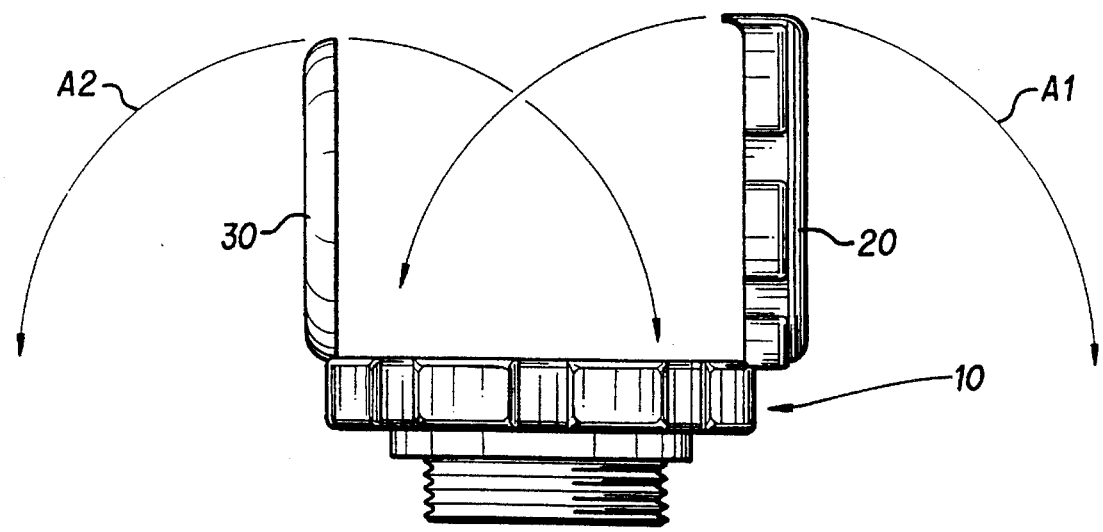
FIG. 5 is a side view of the present invention, with the clamp portion and the disk unfolded into a 90 relationship with the main body of the cap.
Figure 6:
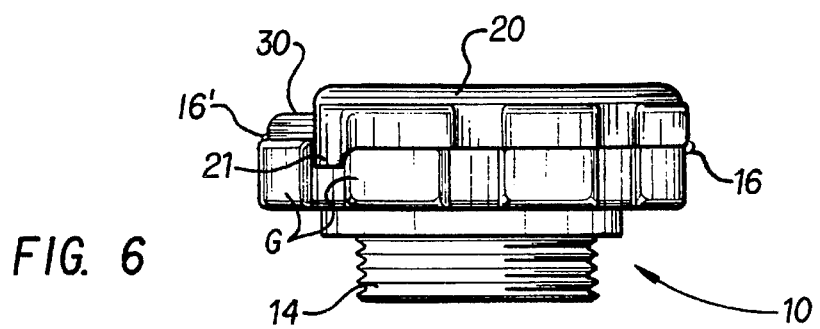
FIG. 6 is a side view of the present invention, with the clamp portion and the disk folded onto the main body of the cap.

A disk 30 is attached to the main body 12 of the cap 10 by hinged attachment means 16', as seen in FIG. 3. These hinge means 16' could be leaf springs, biased or unbiased, "living" hinges made from integral reduced thickness sections of plastic, or any number of known art devices that would allow for rotational movement of the disk 30 in relation to the rest of the cap 10, as described by directional arrow A2 in FIG. 5.

The clamp portion 20 is seen in the this preferred embodiment to have a "crescent moon" type shape. The disk 30 is dimensioned such that it can be inserted into the slots (not shown) that are provided in the trigger T of the gas pump handle H (both seen in FIG. 1). Other shapes, such as a square configuration, or various other angles, would be obvious to one skilled in the art. The major feature to be adhered to is the fact that the configured shape of clamp portion 20 is complementary with the overall outside edges of disk portion 30 in the center of the cap so as to provide substantially smooth and flush surfaces when the clamp portion is pivoted to its non-use position.

A secondary advantage of the instant invention is that it makes it much more difficult to lose the gas cap in that it is clamped onto the pump handle. Even if one does not utilize the cap 10 to hold the pump open, the clamp portion, unfolded, allows the user to hang the cap proximate the tank throat, preventing closure of the tank access cover (not shown). Since the user must remove the cap to close the access cover it is highly unlikely that he will forget to replace the cap in its proper sealing position.

It should be noted that the improved cap 10 could be modified to fit a wide variety of vehicles: not only automobiles, but also trucks, boats, busses, recreational vehicles, airplanes, and the like. Also it is contemplated that a device to disk portion 30 could be used as a key ring.

Following hereinafter is a list of the elements used in the description of the instant invention:

| | |
|---|---|
| improved cap | 10 |
| cap body | 12 |
| tank throat engagement portion | 14 |
| clamp portion | 20 |
| clamp portion protrusion | 21 |
| hinge means | 16 |
| directional arrows | A1, A2 |
| disk | 30 |
| 1st clamp end | 22 |
| 2nd clamp end | 24 |
| pump trigger | T |
| trigger slot | S |
| pump handle | H |
| cap grip members | G |

It is to be understood that the present invention is not limited to the sole embodiment described above, but encompasses any and all embodiments within the scope of the following claims.

1. An improved gas cap construction comprising:

a main cap body portion;

means for engaging a tank throat extending from one side of said cap body;

a raised disk on said cap body being located and hinged on the side opposite said tank throat engagement means, said disk thus defining a first generally planar cap portion surface of said disk and a second generally planar cap portion surface of said disk, said first surface and said second surface being substantially parallel to one another; and a clamp portion hingedly attached to said body portion, said clamp portion and a hinged attachment being configured such that said clamp portion is positionable to lie in a plane substantially parallel to that of both said first surface and said second surface: whereby said improved cap is removable from a throat of a gas tank, and where said clamp portion is movable to a position wherein it's usable to maintain the handle of a gas pump in an operable position and said disk is movable to a position wherein it's usable to maintain the handle of a gas pump in an operable position.

2. The gas cap construction according to claim 1, wherein said clamp portion is a C-shaped member.

3. The gas cap construction according to claim 1, wherein said disk is hinged diametrically opposite of said clamp portion.

* * * * *